United States Patent Office 3,365,999
Patented Jan. 30, 1968

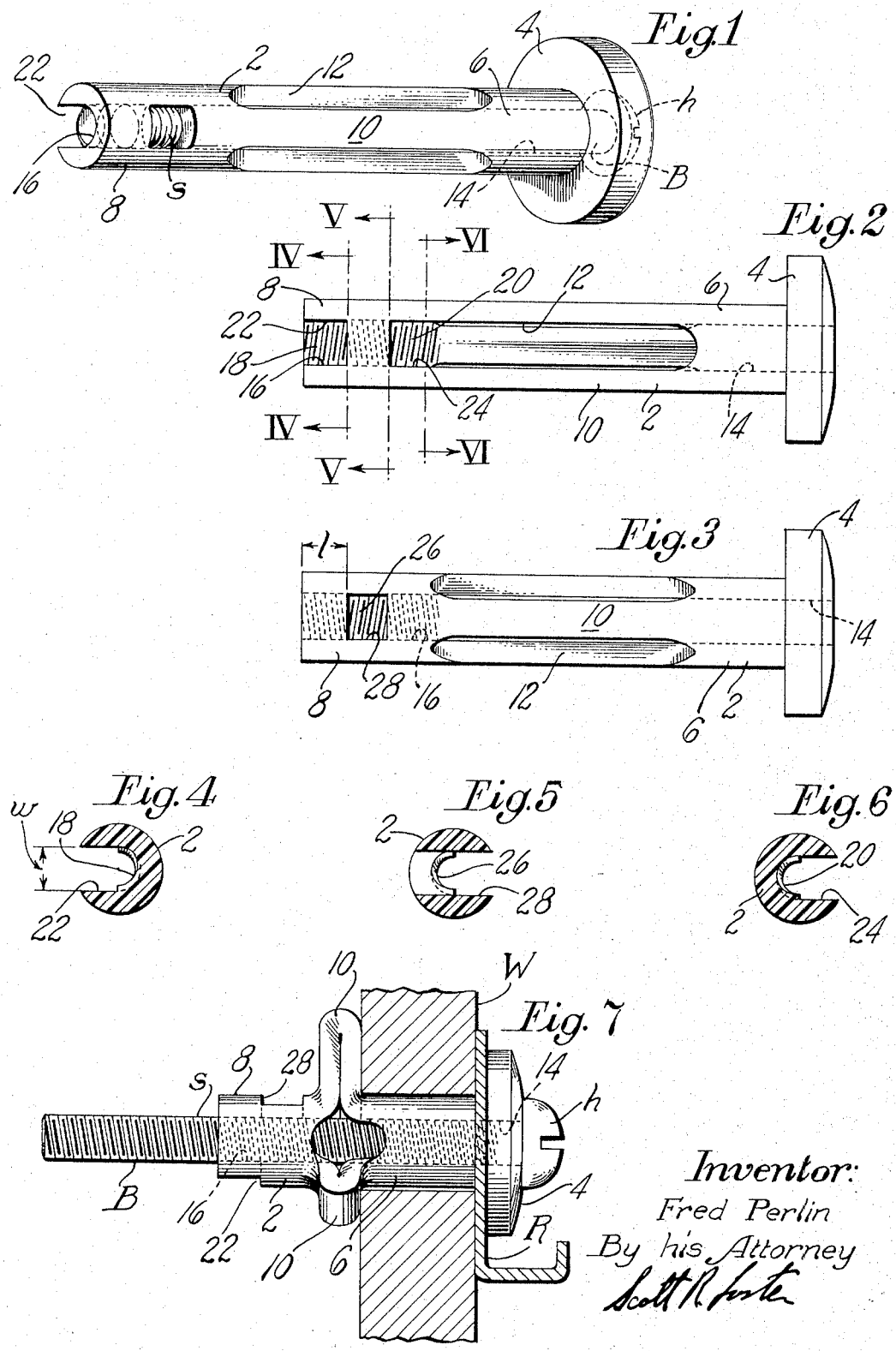

3,365,999
SCREW-ANCHORING DEVICES
Fred Perlin, Hato Rey, Puerto Rico, assignor to United Shoe Machinery Corporation, Flemington, N.J., and Boston, Mass., a corporation of New Jersey
Filed May 26, 1966, Ser. No. 553,113
1 Claim. (Cl. 85—71)

ABSTRACT OF THE DISCLOSURE

A screw anchor for insertion into a bore and adapted to be expanded so as to engage the inside walls of the bore. The anchor comprises a collapsible plastic sleeve for receiving a screw. The sleeve is characterized by an arrangement of internal interrupted segmental threads which engage the threads of the screw to facilitate the expansion of the sleeve and which are easily molded while the sleeve is molded. To permit one step molding of the sleeve, each set of segmental threads is opposed by a cut out portion of the sleeve.

---

This invention relates to screw-anchoring devices and is directed more particularly to an improved expansion anchor of the type in which a sleeve is longitudinally collapsible so that a portion of the sleeve can be spread into anchoring engagement with a wall or other support member.

Difficulty is often experienced in attaching screws to various supporting structures, particlarly plaster walls or walls made of plasterboard, wallboard or the like. The mounting of mirrors, towel bars, medicine cabinets, shelves, curtain fixtures and other similar articles on a wall surface often depends upon the use of an expansion anchor which serves as a retaining means for the screw.

Expansion anchors are generally known in the art and usually comprise a first sleeve portion for supporting a screw and a second spaced aligned sleeve portion, the first and second sleeve portions being integrally joined by a plurality of intermediate circularly spaced connecting strips. The sleeve portions and intermediate connecting strips are generally die stamped from a single sheet of metal which is then bent into cylindrical shape and its opposite end portions soldered or welded together. The second sleeve portion is then threaded internally to receive a screw or threaded bolt extending through the first sleeve portion and centrally of the connecting strips.

More recently, in order to reduce manufacturing costs, the sleeve portions and connecting strips have been made of a plastic material which is molded in the desired cylindrical shape. There has, however, been difficulty in economically providing the plastic anchors with interior threads. Generally, an additional step of threading the interior of the second portion of the sleeve, after completion of the molding operation, has been required. This has proven unsatisfactory from a manufacturing time and cost standpoint.

It is, therefore, one object of the present invention to provide an improved molded plastic expansion anchor having a molded internally threaded sleeve portion.

Another object of the invention is to provide an expansion anchor of the type described above which may be quickly and economically molded in a non-complex mold assembly, and which does not require further operations after molding for completion of the sleeve.

To this end and in accordance with a feature of the invention, the illustrative device comprises an expansion anchor having a collapsible sleeve which comprises first and second sleeve portions interconnected by connecting strips, and in which the second sleeve portion is only partially threaded. As is further described below, the threads are arranged in such a manner that they may be molded into the sleeve while the sleeve is being molded and require only a simple two piece one cavity mold assembly.

The above and other features of the invention, including various novel details of construction and combinations of parts, will now be more particularly described with reference to the accompanying drawings and pointed out in the claim. It will be understood that the particular device embodying the invention is shown by way of illustration only and not as a limitation of the invention. The principles and features of this invention may be employed in various and numerous embodiments without departing from the scope of the invention.

In the drawings:

FIG. 1 is a perspective view of one form of anchor embodying the invention;

FIG. 2 is an elevational view;

FIG. 3 is an elevational view from the opposite side of FIG. 2;

FIG. 4 is a sectional view taken along the line IV—IV of FIG. 2;

FIG. 5 is a sectional view taken along line V—V of FIG. 2;

FIG. 6 is a sectional view taken along line VI—VI of FIG. 2; and

FIG. 7 is an elevational view showing the anchor in the expanded position as is effected by turning the screw shown therein.

Referring to the drawings, it may be seen that the improved design comprises a sleeve 2 having a head 4. The sleeve 2 comprises a first sleeve portion 6 adjacent the head 4 and a second sleeve portion 8 which is spaced from and aligned with the first sleeve portion. The first and second sleeve portions 6, 8, are integral with interconnecting strips 10 which are spaced from each other by slots 12. Located centrally of the head 4 and the first sleeve portion 6 is a smooth wall bore 14. Located centrally of the second sleeve portion 8 and aligned with the bore 14 is a partially threaded bore 16. The bores 14, 16 receive a screw or threaded bolt B, as seen in FIGS. 1 and 7.

Referring particularly to the second sleeve portion 8, it will be noted that a first set of interrupted threads 18 is circumferentially arranged in column and is in axial alignment with a second set of like interrupted threads 20. The first set of segmental threads 18 is opposed by a cutout portion 22 having a length $l$ (that dimension taken axially of the sleeve, FIG. 3), equal to the length of the set of interrupted threads 18. The width $w$ (FIG. 4) of the cutout portion 22 is equal to the diameter of the semicircle described by the grooves between the threads 18. The second set of segmental threads 20 is opposed by an extension 24 of one of the slots 12, its length being equal to the length of the set of threads 20 and its width being equal to the diameter described by the semicircle formed by the grooves between the threads of set 20.

Disposed axially between the first and second sets of interrupted threads 18, 20 but on the diametrically opposed inside surface of the sleeve 2 is a third set of interrupted threads 26 circumferentially arranged in column. Plane V—V (see FIG. 2) indicates the point at which the set of segmental threads 20 ends and the set of segmental threads 26 begins. Plane IV—IV indicates the point at which the set of threads 26 ends and the set of threads 18 begins. Thus, each increment of length of the second sleeve portion 8 has a partial thread for receiving the threaded member B. The set of threads 26 is opposed by a cutout portion 28 of the sleeve 2 having a length equal to the length of the set of threads 26 and a width equal to the diameter of the semicircle described by the grooves between the threads 26. The sets of interrupted threads 18, 20, 26 cooperate to receive the threaded screw or bolt B having a shank portion *s* and a head portion *h*.

In operation, the anchor unit, comprising the sleeve 2 and the screw B, is inserted in a hole in a bracket R, or other article to be mounted, and in a hole in a wall, panel or other such support W (see FIG. 7). The screw is then turned in the clockwise direction. The threads 18, 20, 26 of the sleeve are in engagement with the threads of the shank *s* of the screw B. Thus, clockwise turning of the screw B causes the second sleeve portion 3 to be urged toward the first sleeve portion 6. As the turning of the screw is continued, the second sleeve portion is caused to move along the shank of the screw toward the first sleeve portion, thereby causing the interconnecting strips to bow radially outwardly and subsequently to become firmly pressed against one surface of the wall or support. At this point the screw is securely retained by the anchor which is in turn firmly attached to the wall, thereby assuring a securely mounted bracket R.

While the illustrative embodiment is shown with three sets of interrupted threads, it will be readily apparent that the device will perform satisfactorily with two or more sets of interrupted threads cooperating to threadedly engage the shank of the screw.

Thus, the present invention provides all the benefits of similar devices and in addition, because of its unique internal thread arrangement, is susceptible to manufacture by quick and easy one-step molding in a non-compex one cavity mold, and does not require a subsequent threading operation.

Having thus described my invention, what I claim as new and desire to secure by Letters Patent of the United States is:

1. A screw anchor for insertion into panels and the like, said anchor comprising a unitary molded plastic sleeve having a head, a first sleeve portion adjacent said head, said first sleeve portion and said head having a centrally located bore for receiving a screw, a second sleeve portion spaced from and aligned with said first sleeve portion, an intermediate portion of said sleeve interconnecting the first and second sleeve portions, said intermediate portion comprising alternate strips and slots, said second sleeve portion having a plurality of sets of interrupted segmental threads of equal length, each set being circumferentially arranged on the inner wall of said second sleeve portion in an axially extending column, at least one set of said threads being on the substantially opposite side of the sleeve from at least one other set of interrupted segmental threads, the set of threads nearest said intermediate sleeve portion being opposed by an extension of one of said slots and being in axial alignment with a strip, each of the other sets of threads being opposed by a cutout portion of said sleeve, one of the other sets of threads being in axial alignment with said extended slot, said slot extension and said cut-out portion each having a dimension equal to the axial length of the opposed set of threads and a dimension equal to the diameter of a semicircle described by the grooves between the threads of an opposed set of threads.

References Cited
UNITED STATES PATENTS

| | | | |
|---|---|---|---|
| 1,208,999 | 12/1916 | Malaby | 85—71 |
| 2,148,977 | 2/1939 | Buck | 85—71 |
| 2,538,601 | 1/1951 | Taylor et al. | 85—71 |
| 2,918,841 | 12/1959 | Poupitch | 85—71 |
| 3,006,231 | 10/1961 | Kahn. | |
| 3,083,796 | 4/1963 | Bell. | |
| 3,166,632 | 1/1965 | Woodman. | |

EDWARD C. ALLEN, *Primary Examiner.*